Feb. 26, 1952 L. E. SMITH 2,586,875
HAY FORK
Filed April 7, 1947 2 SHEETS—SHEET 1
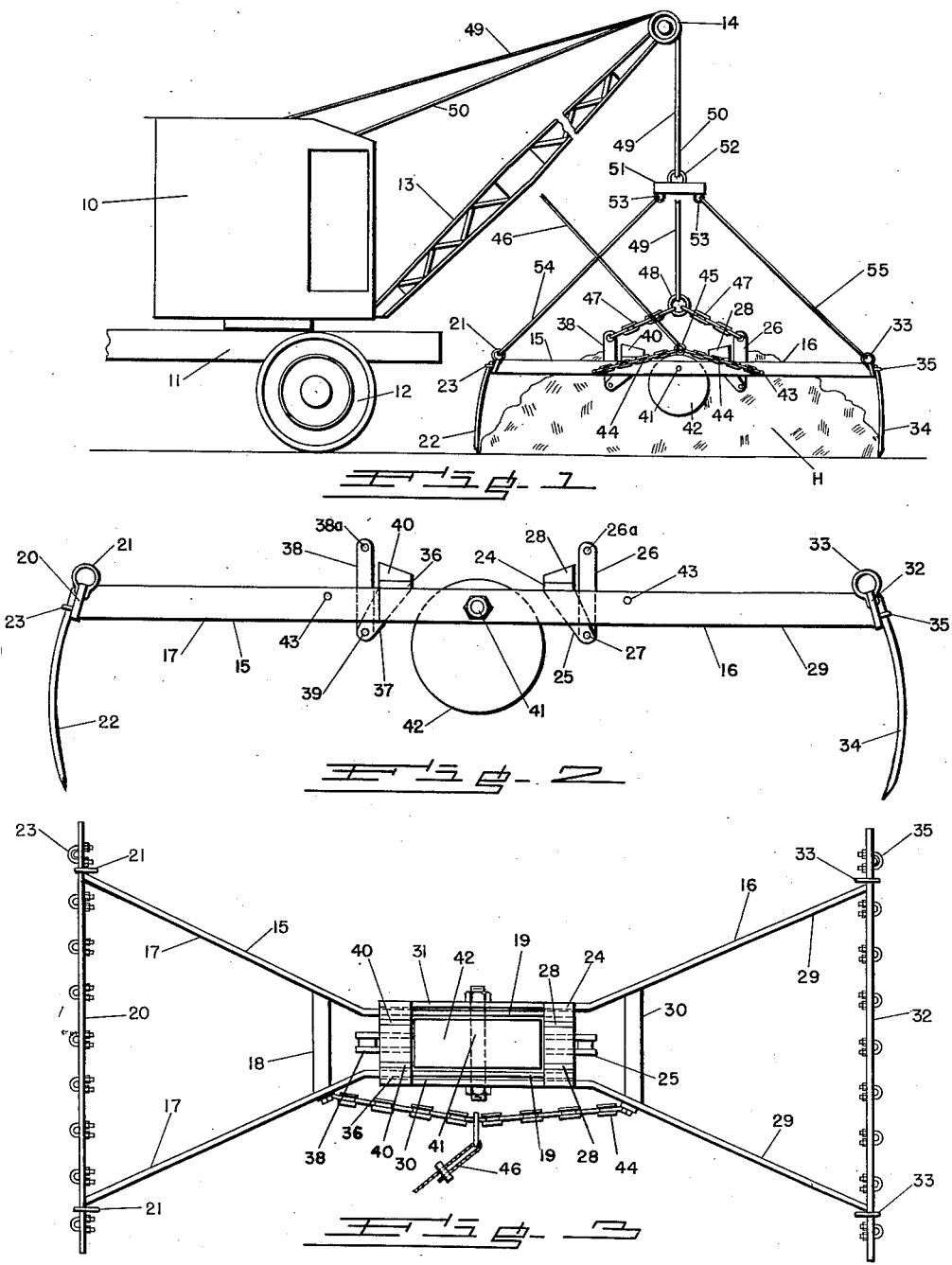
INVENTOR.
LUKE E. SMITH
BY
ATTORNEY Feb. 26, 1952     L. E. SMITH     2,586,875
HAY FORK Filed April 7, 1947     2 SHEETS—SHEET 2

INVENTOR.
LUKE E. SMITH
BY
*ATTORNEY*

Patented Feb. 26, 1952

2,586,875

UNITED STATES PATENT OFFICE 2,586,875

HAY FORK

Luke E. Smith, Denver, Colo., assignor to Quick-Way Truck Shovel Co., Denver, Colo., a corporation of Colorado Application April 7, 1947, Serial No. 739,895

7 Claims. (Cl. 294—111)

The present invention relates to a hay fork. It has to do particularly, although not exclusively, with a hay fork adapted to be power-operated by virtue of its attachment to the hoisting or power mechanism of a truck shovel.

One of the objects of the present invention is to provide an improved hay fork having a wide spread when in open position and which, by virtue of its new and novel structure, is capable of embedding itself deeply into a pile or stack of hay, straw, or similar material so as to grip or grab a maximum quantity of the material to be removed from the pile or stack.

Another object of the present invention is to provide an improved hay fork of the foregoing character which incorporates weighted balancing means causing the two spread-apart series of tines of the fork to penetrate deeply into the pile or stack of material with which it is used.

A further object of the present invention is to provide an improved hay fork, or similar device having improved means for limiting both the opening movement of the fork and also the closing and thus material-gripping movement thereof.

Another object of the present invention is to provide an improved fork of the foregoing material which is capable of easy operation by a lower-shovel operator, one which is of relatively simple construction, and one which is relatively inexpensive to manufacture.

The foregoing and other objects and advantages of the present invention will appear from the following description and appended claims, when considered in connection with the accompanying drawings forming a part of this specification, wherein like reference characters designate corresponding parts in the several views.

In said drawings:

Fig. 1 is a side elevational view illustrating one use of the hay fork of the present invention and showing it attached to a truck shovel, the structure of the truck shovel being shown only fragmentarily.

Fig. 2 is an enlarged side elevational view of the improved fork of Fig. 1, shown in open position and detached.

Fig. 3 is a top plan view of the fork structure shown in Fig. 2; and

Figure 4:
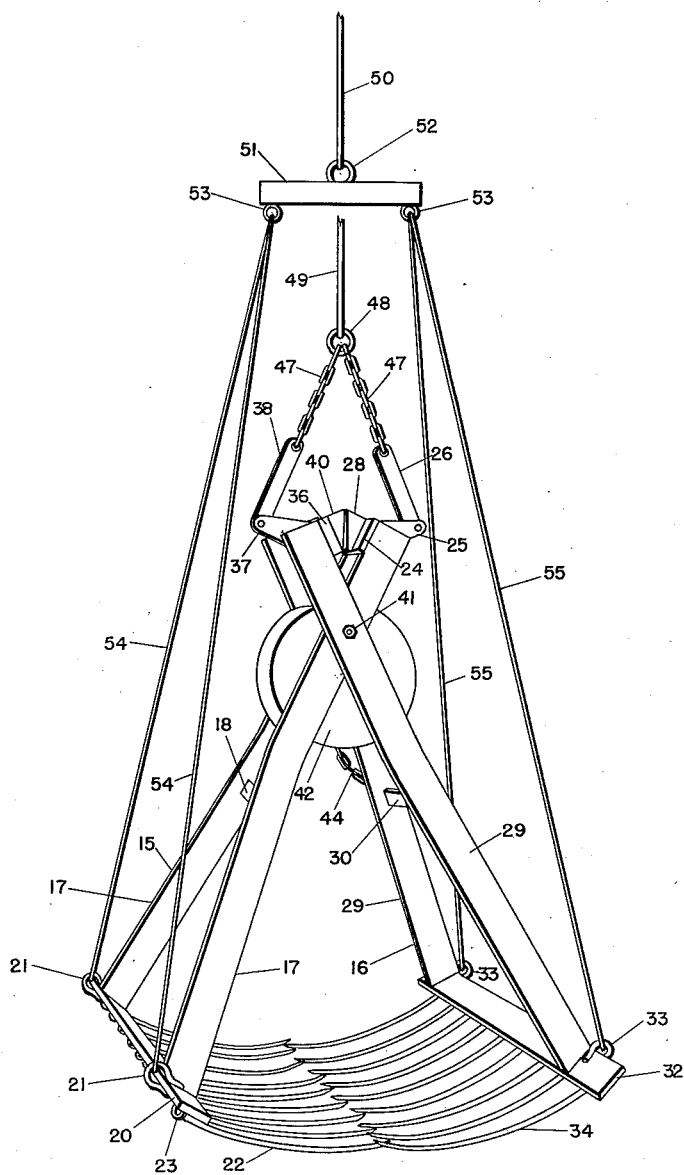
Fig. 4 is a perspective view of the hay fork of the preceding views, shown in closed or material-grasping position.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to the drawings, there is shown in Fig. 1 the cab 10 of a truck shovel, a portion only of the chassis 11 and one of the rear wheels 12 of the truck shovel, being shown. The truck shovel is provided with the usual boom or beam 13 having at its outer end a standard pulley or series of pulleys 14.

The improved hay fork embodying the present invention is shown in detail in Figs. 2, 3 and 4. As shown, the fork comprises a pair of substantially V-shaped frame members 15 and 16 viewed in plan as in Fig. 3. These frame sections or units are preferably alike and frame 15 comprises, as shown, inwardly converging longitudinal members or bars 17 secured together by a transverse brace member 18, the members 17 being extended to provide preferably parallel inner end portions 19, 19. The outer ends of members 17 are connected to a transverse frame member or bar 20 which carries spaced metal eyes, rings, or loops 21. The bar 20 carries a series of fork tines 22. The tines are preferably angularly bent at their upper ends so as to project into and fit within the series of holes or sockets (not shown) formed in the frame member 20. Each tine 22 is preferably secured to the cross bar 20 by a U-shaped member, clamp, or bolt 23, see Figs. 1 and 2. The end portions 19 of the frame unit 15 are connected together by a brace member or strap 24 which carries a depending arm or bracket 25 to which a link 26 is pivotally connected at 27, see particularly Fig. 2. The upper surface of the member or strap 24 carries upwardly projecting blocks or stop members 28.

The other frame member or unit 16 of the hay fork has inwardly converging longitudinal side members 29 which are connected together by a transverse brace member 30, the inner end portions 31 of said side members extending in substantially parallel planes and being disposed outside and substantially parallel to the like portions 19, 19 of the longitudinal frame members 17. The outer ends of frame members 29 are connected to a transverse frame member or bar 32 similar to the member 20 of frame 15. The frame member 32 carries suspending eyes, rings, or loops 33 which are, as shown, located adjacent the outer ends of the frame members 29. As in the case of the corresponding member 20, frame member 32 carries a series of depending tines 34 whose upper ends are bent inwardly to fit into sockets or holes (not shown) formed in the member 32. These tines are preferably rigidly attached to the member 32 by means of U bolts, or the like 35, see Figs. 1 and 2.

The inner end portions 31 are connected together by a transverse member 36 which overlies the end portions 19 of the other frame member. The member 36 carries a depending bracket 37 to which is connected a link 38, the latter being pivoted to said bracket at 39, see Fig. 2. The upper surface of member 36 carries stop members or blocks 40, corresponding to the stop members 28 which form a part of the other frame member or unit 15.

The parallel end portions 19 and 31 of the frame sections 15 and 16, respectively, are pivotally connected together by means of a bolt and sleeve assembly, shown as a whole at 41. This permits the scissors-like movement of the two frame members or units 15 and 16 relatively to one another.

The pivotal connection or assembly 41 provides means also for supporting a preferably round cast iron weighted member or balance weight 42 which, as seen in Figs. 1, 2 and 4, is eccentrically mounted upon the pivot bolt assembly 41. This weight 42 has its upper portion interposed between the parallel frame members 19 and projects partially through the space between the transverse frame members or bars 24 and 36. The member 42 adds weight to the hay fork frame, thus causing it to grab or grasp a much greater bulk or load of material than was possible with previously known hay forks. It also serves as a balancing weight for the scissors-like units or sections of the improved hay fork when the fork is being raised, or lowered, or otherwise manipulated.

The frame members 17 and 29 at one side of the fork, see particularly Fig. 2, are provided with spaced holes or openings 43 which are adapted to receive and support the end links of chains 44, see Fig. 1. These chains are connected together by a ring or link 45 from which a cable 46 extends to the boom or beam 13 of the truck shovel and thence preferably into the cab 10.

The link members 26 and 38 are perforated at 26a and 38a, respectively, to receive the end links of a pair of relatively short chains 47 whose adjacent inner ends are connected to a common ring or link member 48. From the ring 48 there extends a cable 49 which runs over the pulley assembly 14 of the boom and extends into the cab 10 of the truck shovel, see Fig. 1.

A separate cable 50 extends from the hoisting mechanism within the cab 10 over the pulley assembly 14 and is connected to a ring or U bolt 52 of a short bar or member 51. The bar carries adjacent its opposite ends a pair of ring members or loops 53, as seen in Fig. 1. Preferably a single cable 54 extends from the pair of eyes 21 of frame unit 15 and through one of the rings 53, there being preferably a similar single cable 55 extending from the pair of eyes 33 of frame unit 16 and through the other eye or U bolt 53. Thus, it will be understood that the eyes adjacent the outer ends of the like members 20 and 32 of the two frame units 15 and 16, respectively, are connected by means of the cables 54 and 55 to member 51, which latter is connected by a power cable 50 to the hoisting mechanism within the truck shovel cab 10.

Having thus described the various parts and details of the present invention, the operation thereof will now be described.

As seen in Fig. 1 of the drawings the improved hay fork of the present invention, operatively connected with, so as to be operated by, the truck shovel shown in this figure, is in its lowered position with the tines 22 and 35 embracing, or about to embrace the side edges of a pile or stack H of hay. In this position, the parallel frame portions 19 and 31 are engaged by the transverse members 24 and 36 to prevent the frame portions or units 15 and 16 from being moved beyond their substantially horizontal position. The fork has been lowered into this position from an elevated position (not shown) by virtue of playing out the cable 50 which is attached to the eye 52. The cable 50 is, of course, wound around a winding drum located within the cab 10.

From the position of Fig. 1, the fork is moved toward its closed position as seen in Fig. 4 with the series of tines 22 and 34 being in juxtaposition, thus gripping the entire pile or stack H. This movement of the fork members or units 15 and 16 is caused by the winding of cable 49 over a winding drum within the cab 10, said cable having its lower end attached to ring 48. The winding of cable 49 tends to exert a pull on the pair of chains 47 and in turn moves the links 26 and 38 inwardly toward one another, shifting the respective brackets 25 and 37 to cause the swinging movement toward one another of the fork frame units or sections 16 and 17 about the pivotal connection 41. This inward movement toward closed position of the groups of tines 22 and 35 is limited by virtue of the engagement of the blocks or stop members 28 and 40 with one another. It will be understood that while a pull is being exerted upon cable 49 to close the fork, cable 50 is at the same time being played out to lower the block or bar member 51 and the cables 54 and 55 to permit the shifting of the frame members 15 and 16 from their horizontal positions of Figs. 1 and 2 to upright positions, as in Fig. 4, with the tines closed beneath the stack or pile of hay.

The weighted member 42 causes the fork, when lowered by means of cable 50, to provide additional weight and thus increase the downward momentum or force of the frame units and the depending series of tines to cause said tines to penetrate the material to be handled by the fork. The addition of the weighted member 42 causes the fork tines to penetrate more deeply into the material so that the fork may grab or grasp a bigger load to be picked up and transported, than was possible with previously known hay forks.

It will be understood, of course, that the cable 46 extends from the chains 44 and connecting link 45 to an appropriate and convenient point on the vehicle, such as to a position within the cab 10 thereof. This permits the vehicle operator to shift and thus control the position or location of the fork with relation to the load or stack of material to be grabbed or grasped by it.

Having thus described the invention, what is claimed is:

1. A hay fork adapted to be attached to and manipulated by a unit of power machinery, such as a power shovel, comprising a pair of scissors-like frame members, pivot means connecting said frame members together and located adjacent an end of said frame members, a group of tines projecting from the ends of each of said frame members remote from said pivot means, the tines of each group being slightly curved in their length and each group of tines extending generally at a right angle to its respective frame member, means connected to both of the frame members for swinging them about said pivot means into open position with both of said frame members extending substantially in a common plane and with their groups of tines in substantially perpendicular planes with relation to the common plane of said frame members, separate means for moving the frame members and the groups of tines carried thereby in the opposite direction toward each other and into closed and hay-gripping position with two groups of tines extending generally in the same plane, a balance weight member eccentrically mounted upon said pivot means for increasing the weight of said hay fork to force the spread-apart depending groups of tines downwardly into a stack of hay when the frame members and groups of tines are lowered into position over said stack, and stop means carried by the frame members remote from the groups of tines and cooperable with one another to limit the closing movement of the frame members and groups of tines toward each other.

2. Structure according to claim 1, wherein additional stop means is also carried by the frame members remote from the groups of tines and cooperates to limit the opening movement of the frame members and groups of tines away from each other.

3. Structure according to claim 1, wherein each of the frame members is substantially V-shaped, wherein the balance weight member is a disk-like mass of metal mounted directly on and supported by the pivot means for the frame members and disposed in the space between portions of the crossed substantially V-shaped frame members, with portions of said balance weight extending outwardly from and surrounding said pivot means, and wherein said separate means includes link members, a cable, and a chain or chains interconnecting the link members and cable.

4. Structure according to claim 1, wherein additional means is provided for shifting the position of the hay fork with relation to the hay stack to be grasped by it, in which said additional means is independent of said first-named means and also of said separate means and includes a chain or chains connected to the frame members and a cable connected to said chain or chains.

5. A power-operated hay fork comprising a pair of scissors-like frame members, each of said members being substantially V-shaped in top plan view and including two spaced longitudinal bars and cross bars connecting the longitudinal bars together at approximately the opposite ends thereof, pivot means connecting the cooperating converging inner end portions of the frame members together, a group of tines projecting from the diverging outer end portions of each of the frame members at points remote from said pivot means, means connected to both of the frame members for swinging them about said pivot means into open position with both of said frame members extending in a common substantially horizontal plane and with their groups of tines depending therefrom in planes substantially perpendicular to said common substantially horizontal plane, separate means for moving the frame members and their supported groups of tines in the opposite direction toward each other and into closed and hay-gripping position, the inner end portions of said frame members together providing a generally rectangular framework in the vicinity of said pivot means when the frame members are in their common substantially horizontal plane, and a balance weight member eccentrically mounted upon said pivot means and located within the generally rectangular framework for increasing the weight of said hay fork to force the spread-apart groups of tines downwardly into a stack of hay when the frame members and groups of tines are lowered into position over said stack.

6. Structure according to claim 5, wherein stop means is carried by the frame members for limiting the closing movement of the frame members and groups of tines toward one another.

7. Structure according to claim 6, wherein additional stop means is provided for limiting the opening movement of the frame members and groups of tines in directions away from one another.

LUKE E. SMITH.

REFERENCES CITED

The following references are of record in the file of this patent:

UNITED STATES PATENTS

| Number | Name | Date |
|---|---|---|
| 374,195 | Marsh | Dec. 6, 1887 |
| 1,106,651 | Harris | Aug. 11, 1914 |
| 1,590,020 | Golden | June 22, 1926 |